United States Patent
Waite et al.

(10) Patent No.: US 8,713,530 B2
(45) Date of Patent: Apr. 29, 2014

(54) TEST FRAMEWORK OF VISUAL COMPONENTS IN A MULTITENANT DATABASE ENVIRONMENT

(75) Inventors: Andrew Waite, Novato, CA (US); Alan Ballard, Vancouver (CA); K. Sagar Wanaselja, Fairfax, CA (US); Richard Unger, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 400 days.

(21) Appl. No.: 13/104,775

(22) Filed: May 10, 2011

(65) Prior Publication Data

US 2011/0283267 A1 Nov. 17, 2011

Related U.S. Application Data

(60) Provisional application No. 61/334,316, filed on May 13, 2010.

(51) Int. Cl.
*G06F 9/44* (2006.01)
*G06F 9/45* (2006.01)

(52) U.S. Cl.
USPC ........... 717/124; 717/125; 717/126; 717/104; 717/105; 717/140

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |

(Continued)

OTHER PUBLICATIONS

U.S. Office Action dated Jul. 3, 2013 issued in U.S. Appl. No. 12/969,294.

(Continued)

*Primary Examiner* — Qamrun Nahar
(74) *Attorney, Agent, or Firm* — Weaver Austin Villeneuve & Sampson LLP

(57) ABSTRACT

Disclosed herein are techniques for compiling a procedure for testing a page. In some implementations, a component definition for a component instance referred to in computer programming language instructions defining a test procedure for testing a page may be received. The page may be defined by a page description implemented in a markup language. The page description may include a reference to a first portion of a component instance. Compiled wrapper code operable to simulate the presence of the component instance may be generated. The compiled wrapper code may represent the first portion of the component instance referenced in the page description. A compiled test procedure may be generated based on the computer programming language instructions. The compiled test procedure may include the compiled wrapper code. The compiled test procedure may be capable of being executed to perform the test procedure.

25 Claims, 9 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,240,258 B1 * | 7/2007 | Hayes .................... 714/724 |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,566,792 B2 | 10/2013 | Chasman et al. |
| 2001/0032332 A1 | 10/2001 | Ward et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0138510 A1 * | 9/2002 | Tan .......................... 707/501.1 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0023639 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188357 A1 | 8/2005 | Derks et al. |
| 2006/0225054 A1 | 10/2006 | Sentovich et al. |
| 2007/0050467 A1 | 3/2007 | Borrett et al. |
| 2008/0082572 A1 | 4/2008 | Ballard et al. |
| 2008/0183687 A1 | 7/2008 | Law |
| 2008/0249972 A1 | 10/2008 | Dillon |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0063415 A1 | 3/2009 | Chatfield et al. |
| 2011/0145803 A1 | 6/2011 | Soderstedt |
| 2011/0179398 A1 | 7/2011 | Peterson |
| 2011/0276945 A1 | 11/2011 | Chasman et al. |
| 2011/0276946 A1 | 11/2011 | Pletter |
| 2011/0283181 A1 | 11/2011 | Waite et al. |
| 2012/0290407 A1 | 11/2012 | Hubbard et al. |
| 2013/0167122 A1 | 6/2013 | Chasman et al. |

OTHER PUBLICATIONS

U.S. Office Action dated Aug. 14, 2013 issued in U.S. Appl. No. 13/104,772.

(56) References Cited

OTHER PUBLICATIONS

U.S. Notice of Allowance dated Nov. 5, 2012 issued in U.S. Appl. No. 12/943,786.

U.S. Notice of Allowance dated Aug. 28, 2013 issued in U.S. Appl. No. 12/943,786.

Aulbach et al. (Jun. 9-12, 2008) "Multi-Tenant Databases for Software as a Service: Schema-Mapping Techniques", ACM SIGMOD 2008, [Retrieved on Sep. 5, 2012]. Retrieved from the internet: <URL: http://d1.acm.org/citation.cfm?id=1376736> 12 Pages (1195-1206).

"Google Plus Users", Google+Ripples, Oct. 31, 2011 [retrieved on Feb. 21, 2012 from Internet at http://www.googleplusers.com/google-ripples.html], 3 pages.

\* cited by examiner

TEST FRAMEWORK OF VISUAL COMPONENTS IN A MULTITENANT DATABASE ENVIRONMENT

PRIORITY AND RELATED APPLICATION DATA

This application claims priority to commonly assigned U.S. Provisional Patent Application No. 61/334,316, titled Methods and Systems for a Test Framework of Visual Components in a Multitenant Database Environment, by Waite et al., filed on May 13, 2010, which is hereby incorporated by reference in its entirety and for all purposes.

TECHNICAL FIELD

The present disclosure relates generally to on-demand services provided over a data network such as the Internet and, more specifically, to controlling and testing user interfaces in the on-demand services network.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Organizations typically employ many different types of software and computing technologies to meet their computing needs. However, installing and maintaining software on an organization's own computer systems can have its drawbacks. For example, when software must be installed on computer systems within larger organizations, the installation process often requires significant time commitments, since organization personnel may need to separately access each computer. Once installed, the maintenance of such software typically requires significant additional resources. Each installation of the software may need to be separately monitored and upgraded. Further, organization personnel may need to protect each installed piece of software against viruses and other malevolent code. Given the difficulties in updating and maintaining software installed on many different computer systems, it is common for organizations to let software to become outdated. Also, the organization will likely need to ensure that the various software programs installed on each computer system are compatible. Compatibility problems are compounded by frequent upgrading, which may result in different versions of the same software being used at different computer systems in the same organization.

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, and methods for interfacing with phone systems and related services. These drawings in no way limit any changes in form and detail that may be made by one skilled in the art without departing from the spirit and scope of the disclosure.

DETAILED DESCRIPTION

Figure 1:
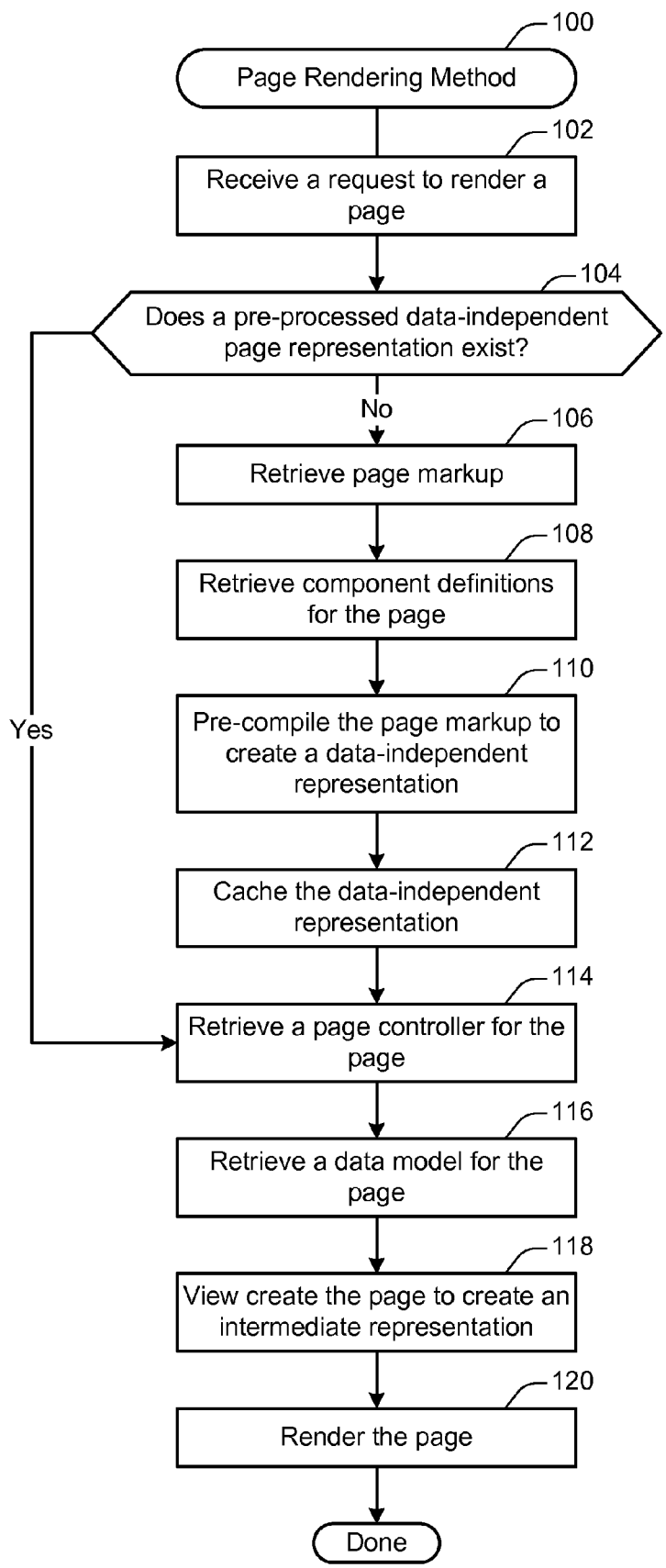
FIG. 1 shows a flow diagram of a method 100 for rendering a page, performed in accordance with one embodiment.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

While the present application will be described with reference to a few specific implementations, the description and specific implementations are merely illustrative and are not to be construed as limiting. Various modifications can be made to the described implementations without departing from the true spirit and scope as defined by the appended claims. For example, the steps of processes shown and described herein are not necessarily performed in the order indicated. It should also be understood that the processes may include more or fewer steps than are indicated. In some implementations, steps described herein as separate steps may be combined. Conversely, what may be described herein as a single step may be implemented in multiple steps.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

Some implementations include techniques for rendering a page. In some implementations, a page refers to an electronic document that may be defined using computer code and rendered for display on a display device. For example, a page may be defined using page markup written in a markup language. The page markup may specify the layout of the page, the content that is displayed in the page, the formatting of the content, and any other information.

In some implementations, at least a portion of the page may be dynamically generated. For instance, the page markup may include references to user interface (UI) components. These components may be defined by UI component classes written in a computer programming language. A UI component class may provide markup for the UI component. The UI component markup may include information such as the layout of UI component, the content to include in the UI component, the formatting of the content, and any other information.

In some implementations, at least a portion of the content displayed in a page may be dynamically generated or retrieved. For instance, the page markup and/or the UI component classes may include references to content in a data model. The data model may be used to access information stored in a database or other storage medium. The data model may be created at runtime so as to include the content and other data needed to dynamically generate the requested page. In this way, the content displayed in a requested page may depend various factors specified by the page developer and may differ between successive renderings of the page.

In some implementations, a page may be rendered by first compiling the page with a page compiler. The page compiler may create an intermediate representation of the page that includes dynamically created instances of referenced UI components and dynamically generated or retrieved data within the structure defined by the page markup. This intermediate representation may then be rendered into a format capable of being displayed on a display device.

In some implementations, the page markup and/or a UI component referenced in the page markup may include one or more references to computer programming language instructions. These computer programming instructions may specify processing operations performed when rendering a page, when receiving input from a rendered page, or at some other point in the page lifecycle. For instance, the computer programming instructions may include a page controller. The computer programming instructions may be compiled via a separate procedure.

In some instances, a page may be tested to determine whether the page is functioning as expected. A dynamically generated page may be tested by first establishing or altering the data model that serves as input to the page. Then, the page may be rendered using the established data model. After rendering, the rendered page file or files may be evaluated to determine whether the page renders as expected.

In some implementations, a page may be tested without fully rendering the page. This may be accomplished by testing the page at an intermediate stage in the page rendering procedure. For instance, the data model and/or the intermediate representation may be tested directly during a partial page compile procedure rather than indirectly via a fully rendered page.

In some implementations, a procedure for testing a page may be defined using computer programming code written in a computer programming language. For instance, a test procedure may assert that a portion of the intermediate representation, such as an attribute of a component in the page, has a particular value. If that portion does not have the expected value, then an error message may be generated.

In some implementations, a procedure for testing a page may be compiled using a test procedure compiler prior to execution of the test page procedure. The test procedure compiler may perform pre-processing operations such as error checking. For example, if the test procedure refers to an attribute X of component Y in page Z, then the test procedure compiler may analyze page Z to ensure that page Z includes component Y, and that component Y has an attribute X.

In some implementations, the test procedure compiler may simulate the presence of the classes needed to construct UI component objects referenced within the test procedure. Instead of retrieving these source code classes, the test procedure compiler may retrieve component definitions from a component registry. The component registry may provide a source of component definitions for components that may be included on pages within the on-demand service environment. These component definitions may specify the names, attributes, and methods valid for a component without include all of the source code necessary for instantiating the component.

In some implementations, the compiled test page procedure may be executed. Executing the compiled test page procedure may include performing operations such as invoking the tested page, dynamically creating the components to be tested, initiating actions in the invoked page, testing portions of the data model used to create a page, and/or testing portions of the intermediate representation generated by the page compile process.

In some implementations, techniques described herein may result in a reduction in the computing load and/or storage space used to conduct a page test. For example, a page may not need to be fully rendered into rendered page files in order to test the page. Instead, the page may be tested at intermediate stages in the page rendering procedure. As another example, full UI component class files may not need to be created when testing a page. Instead, UI component class files may be simulated by retrieving the portions of the UI component class files needed to test the page.

In some implementations, the reductions in computing load and/or storage space may be particularly useful in an on-demand computer services environment and/or multi-tenant database environment. In such environments, many users or entities may access shared computing resources to perform actions such as requesting and testing pages. Reducing the computing load and/or storage space requirements for testing pages may thus improve the computing services experience for all users of the system.

In some implementations, techniques described herein may be used to facilitate testing by users who do not have full access to the on-demand service environment. The service provider may carefully control access to some procedures, such as page rendering or procedure compiling, within the on-demand service environment. However the techniques described herein may allow users of the on-demand service environment to write test procedures that test page generation at the page compiler level without needing the ability to modify secure procedures within the on-demand service environment.

In some implementations, techniques described herein may be used to test the combination of page markup, data model, and business logic used to generate a page without rendering a page. The page markup, data model, and business logic may be tested after their combination into an intermediate representation but before the intermediate representation is rendered to create a rendered page.

In some implementations, techniques described herein may be used to directly test the content and function of a page. Testing a page after it has been fully rendered may be error-prone due to complications or artifacts introduced during the rendering process. In contrast, directly testing the data model used to compile the page and/or the intermediate representation used to render the page may avoid the complications that may arise during the rendering phase. For example, a test may be written in terms of required or expected functionality rather than rendered page appearance, thus reducing or eliminating the occurrence of spurious failures based on irrelevant changes to the rendering of the page (e.g., changes based on colors, styles, sizes, etc.). As another example, a test may be written to initiate an action directly in the intermediate representation, thus avoiding unneeded complexity introduced when rendering the page or interpreting a script used to initiate the action in the rendered page.

FIG. 1 shows a flow diagram of a method 100 for rendering a page, performed in accordance with one embodiment. In some implementations, the page rendering method 100 may be used to produce a rendered page based on page markup, component definitions for the page, a data model for the page, and/or other types of information.

In some implementations, various types of pages may be rendered. For example, a web page may be rendered. The web page may include one or more of HTML, JavaScript®, images, and other types of information that can be accessed via a web browser. As another example, a Personal Document Format (PDF) document, a TeX document, a Doc format document, an XML document, or any other type of document may be rendered.

In some implementations, the page markup may conform to one or more markup languages used to define a page. For example, the page markup may conform to the VisualForce® page markup language available from Salesforce.com®, inc. of San Francisco, Calif. As another example, the page markup may conform to the TeX markup language, the LaTeX markup system, an XML-based markup language, or any of various other proprietary or non-proprietary markup languages used to create pages.

In some implementations, some or all of the operations shown in FIG. 1 may be used to facilitate testing of the page being rendered. For example, tests may be performed on the data contained in the page data model retrieved at 116, in the intermediate representation of the page created at 118, or at any other step in the page rendering process. To facilitate testing, test data may be introduced into the data model retrieved at 116. Alternately, or additionally, actions normally performed on a rendered page such as submitting data to a server or editing data displayed in a page may be performed by initiating such actions in the intermediate representation created at 118. Techniques for executing test methods are discussed in greater detail with respect to FIGS. 2, 4, and 5.

In some implementations, a page may be associated with computer programming instructions. For example, computer programming instructions may function as a page controller. Such instructions may be executed when generating the page, when handling actions initiated via the page, when retrieving the data model for the page, or at another point in the page life cycle. In some cases, these instructions may be pre-compiled via a different compiling procedure. Techniques for linking computer programming instructions with page are discussed in further detail with respect to FIG. 3.

Figure 6:
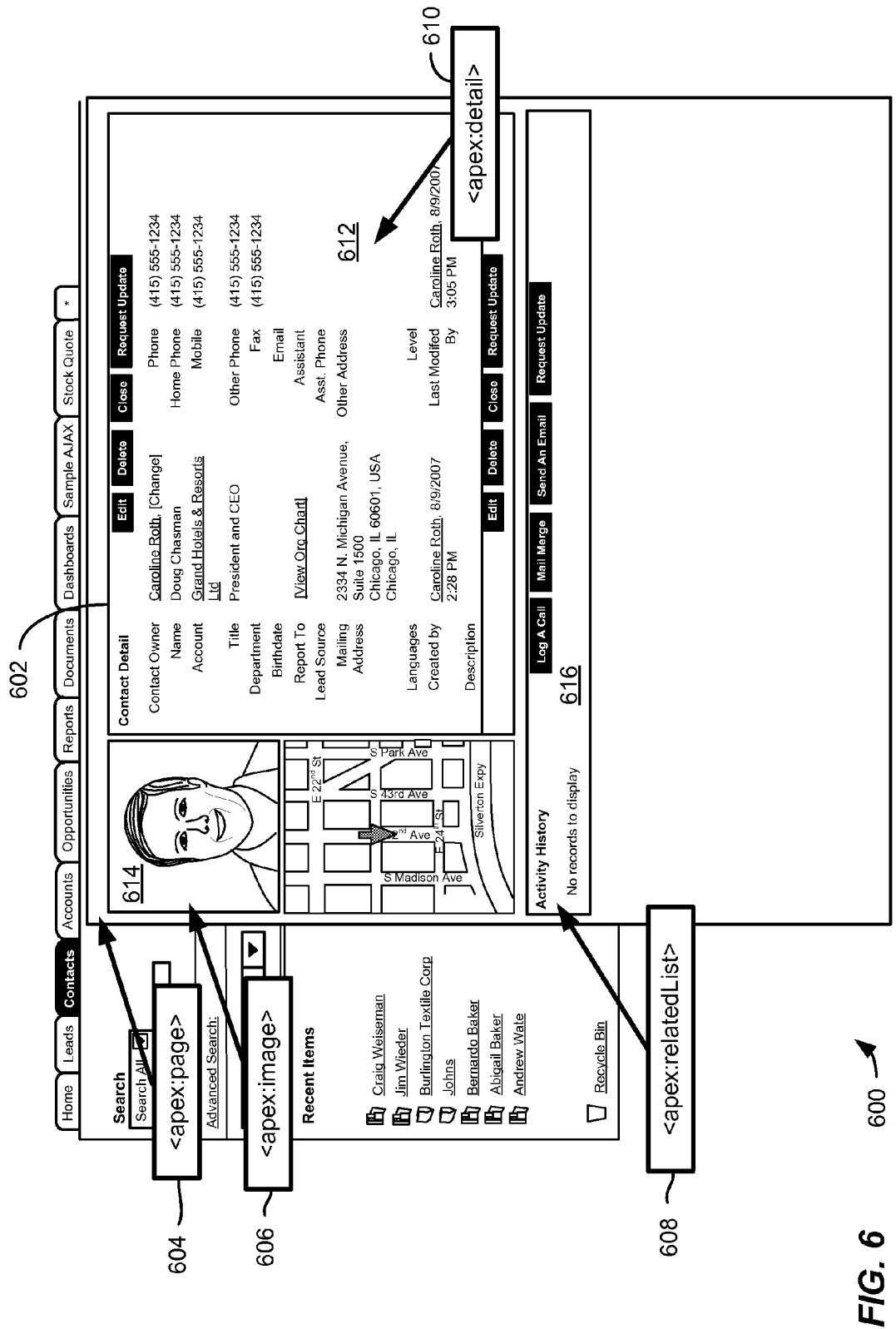
FIG. 6 shows an diagram of a rendered page 600, generated in accordance with one embodiment.

Some portions of FIG. 1 are described with reference to FIG. 6. FIG. 6 shows an image of a rendered page 600 as well as some of the markup used to generate the page. Page 600 shows information related to a Contact object stored in a database.

At 102, a request to render a page is received. In some implementations, the request may be received at a computing device. The computing device may be configured to provide computing services within an on-demand computing services environment.

In some implementations, a request may include one or more parameters specifying a data context for generating the page. For example, page 600 may be generated by transmitting an HTTP request to the on-demand service provider for a contact page. The HTTP request may be associated with URL parameter specifying the particular contact that is requested. In this case, the specific Contact object is associated with a person named Doug Chasman. Then, the data associated with the requested contact may be retrieved as part of the data model for the page.

At 104, a determination is made as to whether a pre-processed data-independent page representation exists. In some implementations, a data-independent page representation may serve as an intermediate step in the procedure for rendering a page. For example, the data-independent page representation may be combined with a data model for the page in a view create operation. The view create operation may yield an intermediate representation of the page, which can then be used to render the page.

In some implementations, a data-independent page representation may be cached when it is created. For example, the data-independent page representation may be stored to a storage medium and a reference to the data-independent page representation may be added to an appropriate index. Since the data-independent page representation may not include dynamically retrieved data (e.g., from the data model), the data-independent page representation may remain constant between page requests. For example, the data-independent page representation of a page that displays information related to an Account object stored in a database may remain constant between successive page requests. In this case, only when the data from a particular Account object is combined with the data-independent page representation will the instance of the page be differentiated from other instances of the page. However, the data-independent page representation may change if the page markup, the page controller, or other static input to the page rendering method has changed. For example, the data-independent representation may change if a new field is added to the Account object and the page markup were updated to cause the new field to display in the page.

In some implementations, the determination made at 104 may be made by accessing a storage medium or index to determine whether a pre-processed data-independent page representation of the page has been previously created, for instance by the page rendering procedure 100 shown in FIG. 1. The determination made at 104 may evaluate both whether a data-independent page representation exists as well as whether a previously-created data-independent page representation reflects the current state of the page markup, the page controller, and any other relevant information used to create the page.

At 106, page markup is retrieved. In some implementations, the page markup may specify the structure, formatting, and/or content to display in a page. For example, the page markup may indicate that the page contains a number of specific components, and that each component contains specific information drawn from the page's data model.

In some implementations, the page markup may be retrieved by accessing a storage medium that stores page markup for pages that may be requested. For example, the page markup may be retrieved from a storage location associated with a entity having data stored in a multitenant database environment.

At 108, component definitions for the page are retrieved. In some implementations, the component definitions may define the components used to create a page. The component definitions may serve as an input to the page pre-compiling and/or compiling process. The component definitions may be retrieved from a component registry, which may function as a standardized, central location for component definitions.

In some implementations, the component definitions may serve as abstract descriptions of the content of components that may be displayed in pages provided via the on-demand service environment. The component definitions may define information such as data fields and methods included in the computer programming language classes used to actually instantiate the components. In this way, the component definitions may act as an interface to the actual component classes. By retrieving the component definitions rather than the entire classes, processing and memory operations may be reduced.

At 110, the page markup is pre-processed to create a data-independent representation. In some implementations, the data-independent representation may function as a translation of the page markup into a structure that reflects the component definitions for the components included in the page.

For example, the page 600 includes the markup <apex: detail>. In the data-independent representation, this markup may be replaced with a representation of the data fields that are displayed in a component, such as the contact owner and the contact name. The values for these data fields may be set as data bindings that can be used to retrieve the actual values for display in the page when the data-independent representation is combined with the data model.

In some implementations, creating the data-independent representation may include performing pre-processing operations that do not require the retrieval of dynamic data or the creation of components that may vary between successive page renderings. For example, components created in the data-independent representation may include data bindings rather than actual data. These data bindings may specify information such as names and locations of data to be presented in the page.

In some implementations, the data-independent representation may include data if the data is static. For instance, some pages may be configured to retrieve some static data regardless of the contextual run-time parameters used to generate the page. In this case, the static data may be included in the data-independent representation.

At 112, the data-independent representation is cached. For example, the data-independent representation may be stored on a storage medium accessible during the page rendering method 100. By caching the data-independent representation, the data-independent representation may be retrieved during successive renderings rather than re-generated with each rendering.

At 114, the page controller is retrieved. In some implementations, a page may be associated with a page controller. The page controller may provide instructions for instantiating UI components on a page, creating data objects included in the data model, handling actions generated via a rendered page, and other page-related operations.

In some implementations, some operations shown in FIG. 1 may not be entirely distinct when implemented in computer code. For instance, the data model may be retrieved at 116 in part during the execution of the page controller. As another example, the execution of the page controller may influence the view create operation discussed with respect to operation 118. The specific implementation of these and other method operations may be strategically determined based on considerations such as the computer programming language being compiled.

In some instances, a page may be associated with a standard controller. For example, because page 600 is focused on a single standard Contact object, page 600 may be associated with a standard Contact controller used to access and interact with a contact object.

In some instances, a page may be associated with a custom controller or a hybrid controller that includes custom operations that extend a standard controller. The custom controller or hybrid controller may contain instructions for custom operations related to a page, such as generating custom objects or performing user-defined processing steps for handling page actions.

In some implementations, the page controller may be compiled. In some embodiments, the compiling of the page controller may be performed in a manner similar to the compiling of the test procedure discussed with respect to FIG. 3. Alternately, the compiling of the page controller may be performed in a different manner. For example, the page controller may be written in a different language than a test procedure. In some instances, the page controller may be pre-compiled. Alternately, the page controller may be compiled at operation 114 if it has not already been compiled.

At 116, a data model for the page is retrieved. In some implementations, the data model may define, contain, and/or provide access to the data used to create the intermediate representation of the page. For example, the data model may include data referenced directly within the page markup, data referenced within or accessed by the UI component classes, and/or data objects accessed by the page controller or other computer programming instructions. In some implementations, the data model may include one or more name/value pairs. The data-independent representation may include data bindings that specify names for data to be presented in the page. The data model may match these data bindings to the actual data to be presented in the page. In some implementations, data in the data model may be retrieved when need during the execution of the page controller.

In some implementations, the data model may be retrieved from various sources. For example, at least a portion of the data model may be retrieved from a database. As another example, at least a portion of the data model may be retrieved from a repository of data object definitions. A repository of data object definitions may be referred to herein as a Universal Data Dictionary (UDD). As yet another example, at least a portion of the data model may be generated by the instantiation of UI components contained within the page. These UI components may generate temporary data objects when created.

In some implementations, the data model may depend on contextual factors related to the page request. For example, the page may be requested at 102 by a particular user associated with a particular entity that accesses computing services via the computer services environment. In this case, the data model may include data that reflects the particular user and the particular entity. As another example, the page request may be accompanied by a URL parameter such as a parameter that specifies a particular database object (e.g., an Account). In this case, the page may retrieve data corresponding to the particular database object referenced by the URL parameter.

In some implementations, the data model may depend on the page controller retrieved at 114. For example, the page controller may contain computer programming instructions that facilitate the creation of a database object or a temporary object used in the data model. As another example, the page controller may contain computer programming instructions that dynamically determine a data record in a database to use when populating a data object in the data model.

In some instances, a test data model may be retrieved at 116. For example, a test procedure may specify a data model to use when a page is invoked. In this way, the data input to the page compiling may be controlled to determine whether the page functions as expected. Additional details regarding page test procedures are discussed with reference to FIGS. 2, 4, and 5.

At 118, a view create operation is performed to create an intermediate representation. In some implementations, the intermediate representation may be created by combining the data-independent representation with the data included in the data model retrieved at 116. For example, references to dynamically generated or retrieved data within the data-independent representation may be replaced with data selected from the data model. As another example, components whose existence is predicated on particular data values in the data model may be created or not created based on data values retrieved from the data model.

In some implementations, the intermediate representation used by the test procedure and the rendered page may be produced together. In this case, the test procedure may simply ignore the rendered page. Alternately, the rendered page may be used to perform an action for testing. For example, when an action is performed in the intermediate representation, JavaScript® or other processing operations in the rendered page may be performed. These processing operations may simulate client-side handling of a simulated user UI action in the rendered page.

In some implementations, the intermediate representation may be created in conjunction with the execution of at least some operations defined in the page controller. For instance, the page controller may specify operations for creating custom objects, for dynamically determining a first portion of dynamic data to include in a page based on the content of a second portion of dynamic data to include in the page.

At 120, the page is rendered. In some implementations, rendering the page may include any operations for creating a page representation that can be displayed on a display device. Since the page information necessary for rendering the page is largely or entirely contained within the intermediate representation, the rendering of the page may include a translation from the intermediate representation to the format used for rendering. For example, a page may be rendered in HTML, PDF, or any other format used to display a page on a display device.

In some instances, the page may not actually be rendered. As discussed with respect to FIGS. 2, 4, and 5, some or all of the operations shown in FIG. 1 may be selectively performed when a page is invoked for testing purposes. When the page is being tested via a test procedure, there may be no need to render the page for display on a display device. In this case, various operations for testing the page may be performed instead of, or in addition to, rendering the page at operation 120.

In some implementations, a page may be rendered in a manner different than that shown in FIG. 1. If page is transformed into an intermediate representation based on a data model and if the intermediate representation can be accessed, queried, and/or used to initiate page actions by a page test procedure, then a page test procedure may be used to test the requested page. Thus, the specific processing operations used to pre-process, view create, or otherwise process the requested page to create a rendered page may be strategically selected based on factors such as the type of page markup being processed, the types of component definitions supplied to the page rendering process, and the nature of the computer programming languages and markup languages used to create the page.

Figure 2:
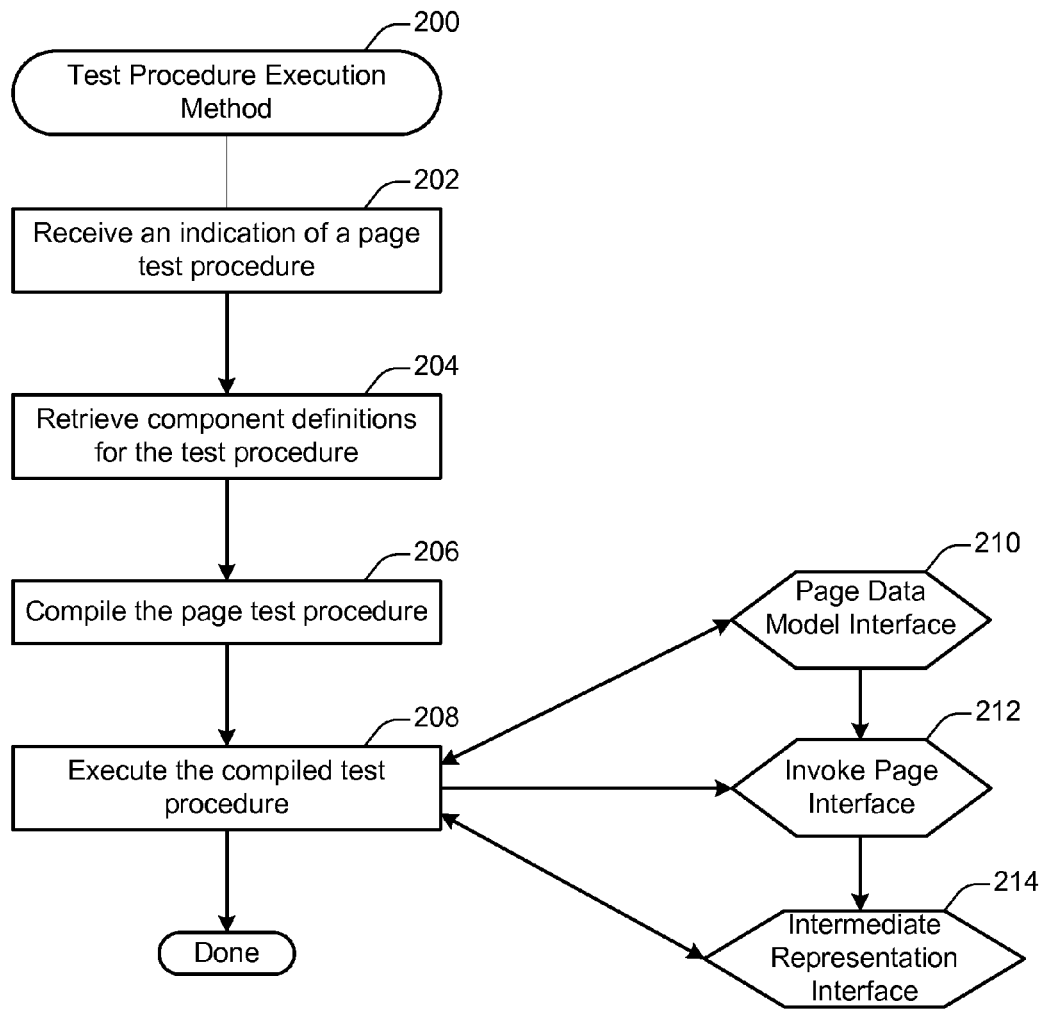
FIG. 2 shows a flow diagram of a method 200 for executing a test procedure, performed in accordance with one embodiment.
Figure 4:
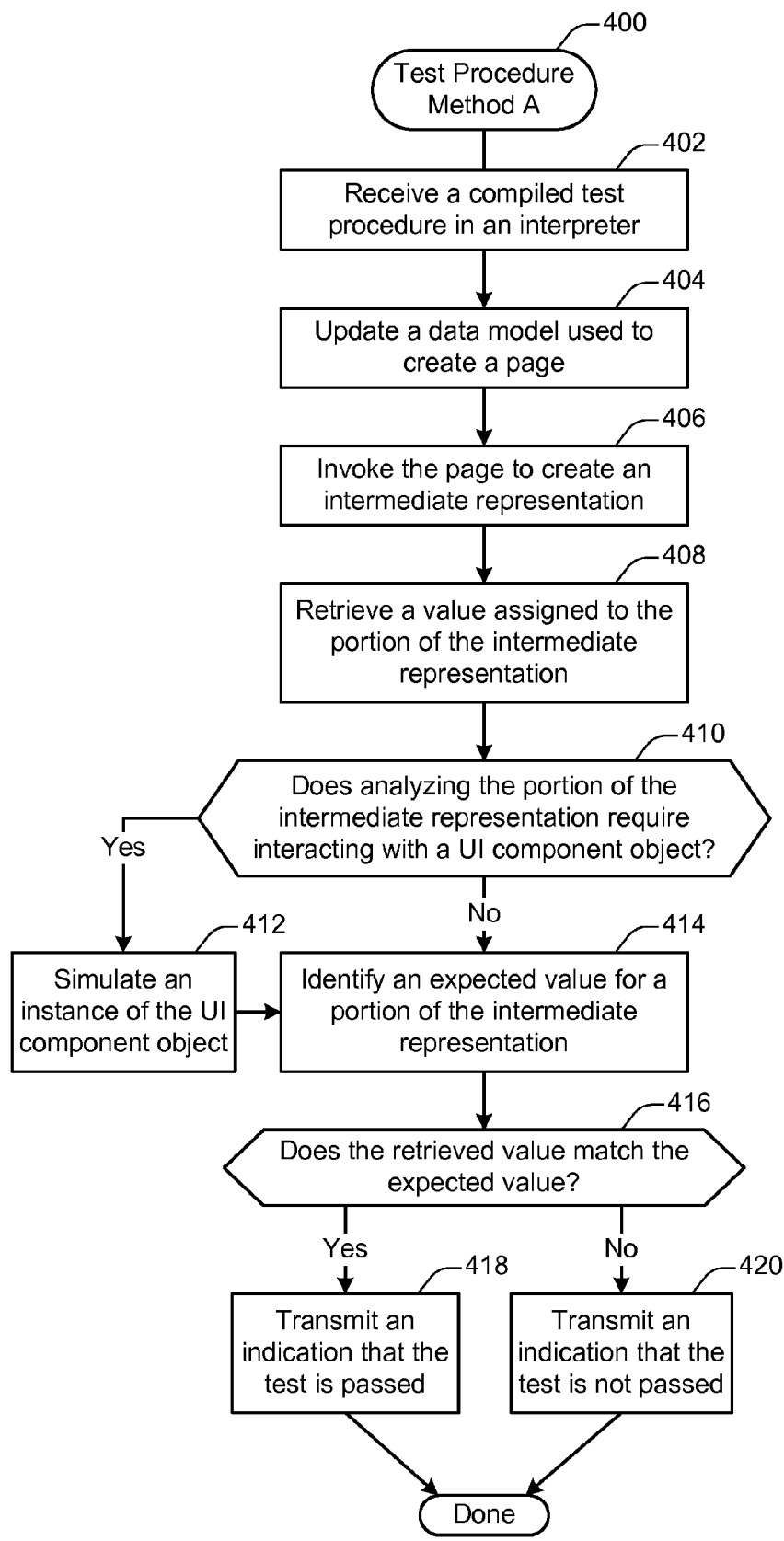
FIG. 4 shows a flow diagram of a method 400 for a test procedure, performed in accordance with one embodiment.
Figure 5:
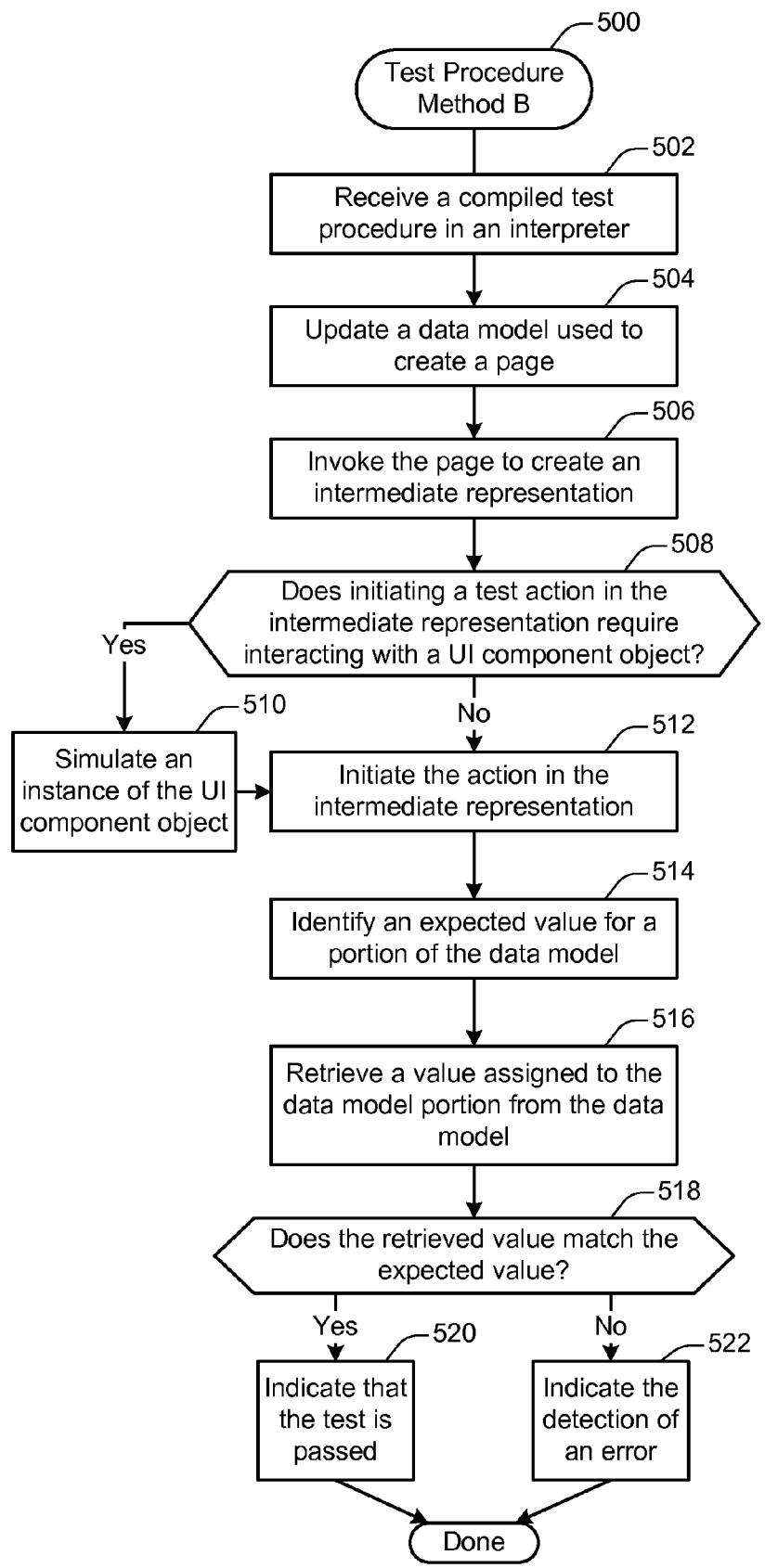
FIG. 5 shows a flow diagram of a method 500 for a test procedure, performed in accordance with one embodiment.

FIG. 2 shows a flow diagram of a method 200 for executing a test procedure, performed in accordance with one embodiment. Examples of the kinds of test procedures that may be executed via the method 200 are shown in FIGS. 4 and 5.

In some implementations, a test procedure executed via method 200 may interact with operations shown in FIG. 1 for rendering a page. The test procedure may selectively initiate some or all of the operations shown in FIG. 1 in order to facilitate testing of the markup or computer programming language instructions associated with rendering the page.

At 202, an indication of a page test procedure is received. In some implementations, the page test procedure may be defined via instructions in a computer programming language. For instance, the test procedure include instructions in Apex®, Java®, or any other suitable computer programming language.

In some implementations, the page test procedure may be provided by a service provider associated with an on-demand computing services environment. For example, the page test procedure may be provided to test pages provided for general use or provided for adaptation by users of the on-demand computing services environment.

In some implementations, the page test procedure may be provided by an entity using the on-demand computing services environment. For instance, an organization may create its own customized pages via a markup language. The organization may then create test page procedures for testing these customized pages.

At 204, component definitions for the test procedure are retrieved. In some implementations, the retrieval of the component definitions at operation 204 may be substantially similar to operation 108 discussed with respect to FIG. 1. That is, the test procedure may be analyzed to determine which components are referenced within the test procedure. Then, the component definitions for components referenced by the test procedure may be retrieved.

At 206 the page test procedure is compiled. Although the application code is referred to herein as being compiled, compiling as used herein may also be applied to interpreted languages. Regardless of whether the compiled instructions are executed in an interpreter or any other run-time environment, various types of operations may be performed when compiling the instructions.

In some implementations, compiling the application code instructions may include performing any operations related to lexical analysis, preprocessing, parsing, semantic analysis (Syntax-directed translation), code generation, and code optimization.

In some implementations, the application code instructions may be compiled in any compiler configured to compile computing programming instructions in the language in which the application code instructions are written. For instance, an Apex® compiler, a Java® compiler, or any other type of compiler may be used depending on the computer programming language.

In some implementations, compiling the page test procedure may include operations for checking the validity of the data references within the page test procedure. For example, a data field of a UI component instance referred to within the page test procedure may be checked against the component definitions retrieved at operation 204 to ensure that such a UI component exists and that the UI component instance has such a data field. As another example, an action initiated within the page test procedure may be compared against a component definition of a UI component or a page controller retrieved at operation 204 to ensure that the action corresponds with a valid method associated with the page.

In some implementations, compiling the page test procedure may not include generating full class files for at least some UI components referenced within the page test procedure. Instead of generating these class files, the UI components may be simulated at run-time, as discussed with reference to FIGS. 4 and 5. In many cases, test procedures may use only limited functionality of the UI components. By simulating these objects at run-time, the page may be tested with a reduced computational load and without generating an excessive number of files.

In some implementations, the compiled page test procedure may be cached. In this case, the page test procedure may not need to be re-compiled upon successive executions of the page test procedure. The caching of the page test procedure may be substantially similar to the caching of pre-processed data-independent page representation discussed with respect to operation 104.

At 208, the compiled test procedure is executed. In some implementations, the compiled test procedure may be executed in an interpreter. The interpreter may be operable to interpret computing programming instructions generated by the test procedure compiling process.

In some implementations, the compiled test procedure may include one or more interactions with the page data model interface 210, the invoke page interface 212, and/or the intermediate representation interface 214. These interfaces may provide mechanisms for compiling the page as well as retrieving or altering portions of the page before and after the page is compiled.

At 210, an interface for accessing the page data model is provided. In some implementations, the interface for accessing the page data model may allow retrieving portions of the page data model for comparison. Alternately, or additionally, the interface for accessing the page data model may allow modifying portions of the page data model for use in invoking a page to determine the results in the intermediate representation.

At 212, an interface for invoking the page is provided. In some implementations, the interface for invoking for invoking the page may allow the executed test procedure to create an intermediate representation of the page based on a data model for the page. For example, the interface for invoking may allow the executed test procedure to initiate operations 116 and/or 118 shown in FIG. 1 based on a data model provided to the page compiling operation.

In some implementations, invoking a page may include initiating any operations necessary for creating the intermediate representation. Thus, in some instances, some or all of operations 102-118 may be performed.

At 214, an interface for accessing the intermediate representation created by the page invocation operation is provided. In some implementations, the interface provided at 214 may allow the retrieval of portions of the intermediate representation created by invoking the page via the invoke page interface 212. These portions may then be compared with expected values to determine whether the page and its constituent components are functioning as expected.

In some implementations, the interface provided at 214 may allow actions to be triggered in the intermediate representation. These actions may be performed to simulate user UI actions on the page. These actions may include method calls for executing computer programming language instructions. The actions may include method calls accessed via a page controller associated with the invoked page, method calls accessed via UI components contained within the invoked page, or other methods associated with the page.

In some implementations, the interfaces 210, 212, and 214 may be accessed various times and in various orders and combinations within the execution of a single test procedure. Using the interfaces 210, 212, and 214, various aspects of page generation may be tested. For example, markup associated with the page or UI components contained within the page may be tested. As another example, computer programming instructions associated with a UI component or page controller may be tested. As yet another example, the page compiling procedure itself may be tested by comparing input and output on a page and/or UI components believed to be functioning properly.

In some implementations, the test methods shown in FIGS. 4 and 5 allow directly testing a combination of page markup, input data, business logic, and/or controller code. Using such techniques, testing of the generation of a page may be separated from testing the rendering of the page.

Figure 3:
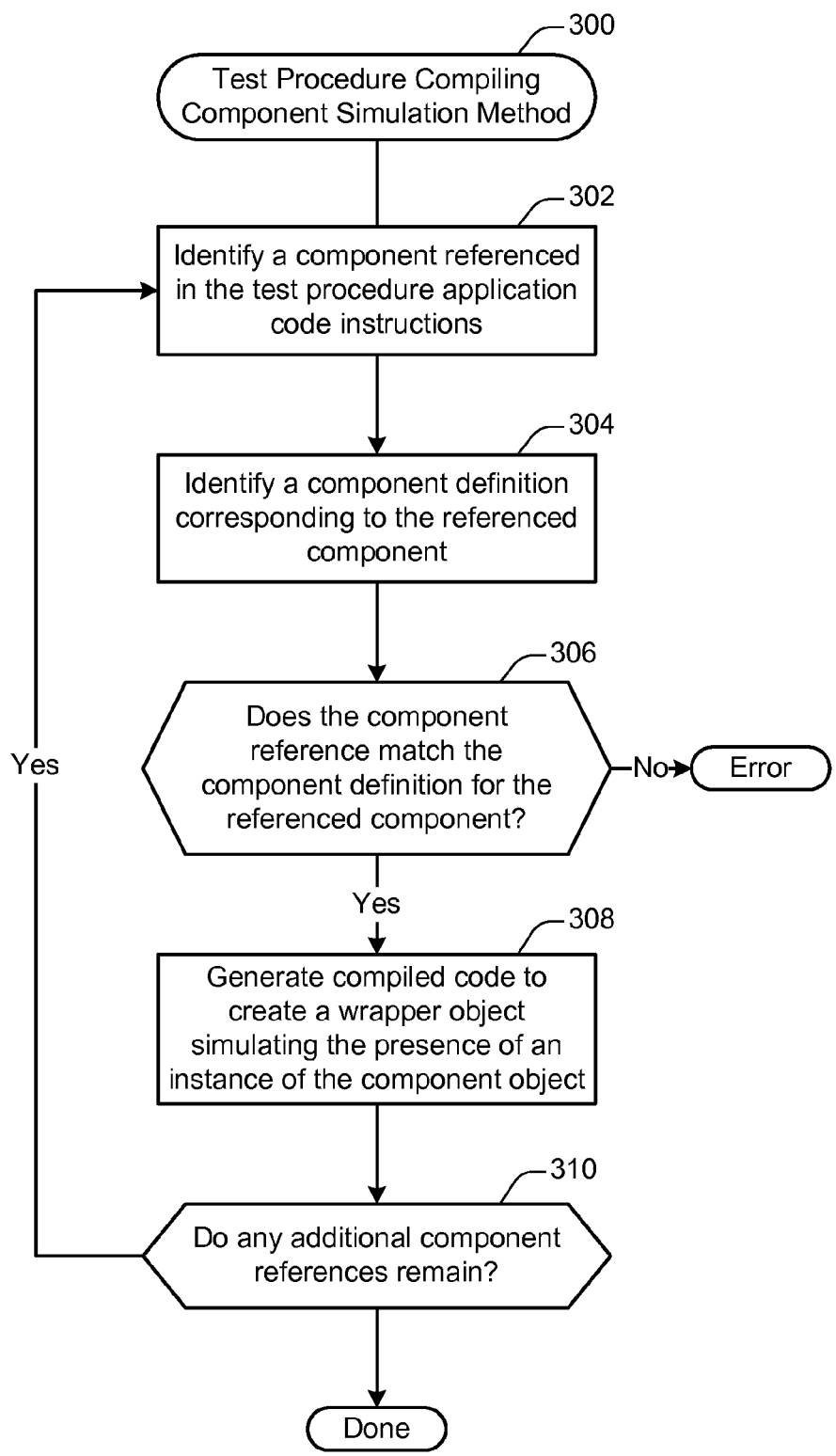
FIG. 3 shows a flow diagram of a method 300 for processing application code instructions, performed in accordance with one embodiment.

FIG. 3 shows a flow diagram of a method 300 for simulating a definition of one or more components during the compiling of a test procedure. In some implementations, the method 300 may be performed when a test procedure is compiled at operation 206 shown in FIG. 206. However, in some implementations the operations shown in FIG. 3 may not be performed at operation 206, and the test procedure may be compiled using different techniques.

As discussed with respect to operation 206, compiling a test procedure may include various operations performed for various purposes. The operations shown in FIG. 3 represent only a portion of the operations that are performed in some implementations.

In one implementation, FIG. 3 focuses on operations that may be performed when the compiling procedure encounters a UI component referenced within the test procedure instructions. For example, the test procedure may include a reference to an Account component that represents an Account object. The Account component may be contained within the page being tested by the test procedure. In this case, the test procedure may instantiate the Account component by retrieving a portion of the intermediate representation and compare the values of the Account component data fields to test values.

In some implementations, the method 300 may be employed to simulate an instance of a component object in the compiled test procedure. Conventional compile processes for computing programming instructions retrieve a class definition for each component referenced by the instructions. The class definition includes computer programming instructions for creating an instance of the component object. After retrieving a class definition, a conventional compile process performs a large series of steps to convert the component reference into code that can be executed by an interpreter or other run-time environment.

Retrieving class definitions and instantiating objects for every potentially or actually referenced component may be computationally intensive, may require large amounts of temporary memory, and/or may generate many files that need to be stored on a storage medium. A single page or test procedure may include tens, hundreds, or even thousands of objects. However, failing to check the class references at compile time may result in run-time errors. Further, an instruction including a component reference in the computer programming instructions needs to be executed at run-time, so data field access and method calls need to be appropriately transformed into code that can be executed by an interpreter or other run-time environment.

In some implementations, in contrast to the conventional approach, the method 300 simulates an instance of the component object. Rather than retrieving the entire class definition for a component, a simplified component definition may be retrieved. The component definition may provide information such as the component type, the component name, data fields contained within the component, and methods contained within the component. Based on the component definition, the method 300 may verify that the component exists and that the references to the component and any data fields and methods within the component are valid. However, the entire class definition need not be retrieved and the component need not actually be instantiated.

In some implementations, instead of instantiating a component to translate a component reference into byte code, the component reference may be wrapped in a wrapper component. The wrapper component may allow access to the component as included within the data model or intermediate representation of the page without actually instantiating the component. In this way, the wrapper component "simulates" the existence of an instance of the component. The simulated component may allow the test procedure at run-time to access data fields of the component within the data model or the intermediate representation of the page. The simulated component may also allow the test procedure to initiate actions associated with the component in the intermediate representation of the page.

In some implementations, the component may be simulated only as much as is necessary. For example, data fields and methods that are not actually referenced by the test procedure may not be simulated in the simulated component.

In some implementations, the test procedure may be written in the same computer programming language as the referenced component. For example, both languages may be Java, Apex, C, C++, or another language. In some implementations, the test procedure may be written in a computing programming language different than that in which the referenced component is implemented.

At 302, a component referenced in the test procedure application code instructions may be identified. In some implementations, the referenced component may be identified as part of the normal compile process for the test procedure application code instructions. Alternately, or additionally, the compile process may search the test procedure application code instructions for component references and process these references separately from other parts of the compile process.

At 304, a component definition corresponding to the referenced component is identified. In some implementations, the component definition may be identified from within the component definitions retrieved at operation 204 shown in FIG. 2. For example, a component name contained within the component reference may be compared to a component name within the retrieved component definitions.

At 306, a determination is made as to whether the component reference matches the component definition for the referenced component. In some implementations, the determination made at 306 may include comparing portions of the component reference such as the component name, the component type, a data field within the component, and/or a data field type within the component. Also, the determination made at 306 may compare methods associated with the component, including method names, method return values, method parameter types, and/or the number of method parameters.

In some implementations, a determination that the component reference does not match the component definition may result in an error being declared. The detection of an error may in some instances cause the compile procedure to terminate. Alternately, at least some errors may be flagged for analysis, and the compile process may continue.

As discussed herein, in some implementations, the component definition may be written in a language different than the test procedure application code instructions. In this case, the comparison made at 306 may include comparing a reference to a component in one language (e.g., Apex®) to a definition of a component in another language (e.g., Java®).

At 308, compiled code operable to generate a wrapper object simulating the presence of an instance of the component object is created. In some implementations, the wrapper object may be generated when the compiled code is encountered during the execution of the test procedure.

In some implementations, the wrapper object may facilitate the interaction of the test procedure with component data associated with an instance of the component created within a page being tested by the test procedure. The component data may be contained within the intermediate representation of the page or within a data model used to create the page.

At 310, a determination is made as to whether any additional component references remain. In some implementations, the determination may be made by analyzing the test procedure instructions. In some implementations, an explicit determination may not be made. Instead, the test procedure compiling procedure may simply check each component reference and create a corresponding wrapper object whenever a component reference is encountered during the normal compile process.

In some implementations, the test procedure may be written in the same computer programming language as the referenced component. For example, both languages may be Java, Apex, C, C++, or another language. In this case, the wrapper object may be implemented in a language similar to that of its contained component object.

In some implementations, the test procedure may be written in a computing programming language different than that in which the referenced component is implemented. For example, the test procedure may be written in Apex, while the component class may be written in Java. As another example, the test procedure may be written in Java, while the component class may be written in Apex.

FIG. 4 shows a flow diagram of a method 400 for a test procedure A. The method 400 is an example of the type of testing procedure that can be used in conjunction with the techniques described herein in some implementations.

In some implementations, the method 400 is an example of a test procedure that may be executed at operation 208 shown in FIG. 2. The test procedure may be compiled prior to execution. For example, the test procedure shown in FIG. 4 may be received at 202, compiled at 206, and executed at 208.

The method 400 is an example of a test procedure in which a page is tested by first making a change in the data model used to create the page and then checking a result of the change in the intermediate page representation. In some implementations, one or more of the operations shown in FIG. 4 may be performed at operation 208 shown in FIG. 2. For example, a change to the page data model may be made via the page data model interface at operation 210. Then the page may be invoked via the invoke page interface at operation 212. Finally, a value may be checked in the resulting intermediate representation via the intermediate representation interface at operation 214.

One example of a test method conceptually similar to the method shown in FIG. 4 is as follows. An account object may be created in a data model or data base, and the data fields of the account object may be set to test values. Then, a page that displays the account object may be generated. In the intermediate representation, a data field in the component representing the account object may be checked to determine whether the value of the data field matches the value in the account object in the database.

At 402, a compiled page test procedure is received in an interpreter. The interpreter may be any interpreter capable of interpreting the compiled test procedure. For example, if the test procedure is written in Apex®, then an Apex® interpreter may be used. If instead the test procedure is written in Java®, then a Java® byte code interpreter may be used.

At 404, a data model used to create a page is updated. In some implementations, the data model may be updated via the page data model interface 210 shown in FIG. 2. Updating the data model may include any operations for specifying or defining data values or settings assigned to parameters within the page model. For example, updating the data model may include establishing a data value for display in a UI component on the page. By updating the data model, the page may be provided with known and controllable input prior to rendering. In this way, the actual portion of the intermediate representation resulting from the page compiling operation may be compared against an expected value for that portion of the intermediate representation.

At 406, the page is invoked. In some implementations, the page may be invoked via the invoke page interface 212 shown in FIG. 2. Invoking the page may result in processing page markup code and/or computer programming language instructions used to generate the page.

As discussed with respect to FIG. 2, invoking a page may include the performance of at least some operations associated with rendering a page. For example, a data-independent representation of the page may be retrieved or generated at operations 104-112 shown in FIG. 1. The data-independent representation may then be compiled, with reference to the data model as updated in operation 406. Compiling the data-independent representation in conjunction with the data model to create an intermediate representation is discussed with respect to operation 116 shown in FIG. 1.

In some implementations, a page may be associated with application code such as a page controller, as discussed with respect to FIG. 3. As discussed with respect to FIG. 3, application code can include any computer programming language instructions related to rendering a page or handling actions initiated from a rendered page. Invoking the page may in some instances include the execution of all or selected portions of application code associated with the page. For example, a constructor method for a UI component may modify the markup for displaying the UI component based on data contained in the data model.

In some implementations, invoking the page may result in the generation of an intermediate representation of the page. Were the page being rendered rather than tested, the intermediate representation could then be used to render the page for display on a display device, as discussed with respect to operation 118 shown in FIG. 1. However, in FIG. 4, the intermediate representation is used for testing instead of, or in addition to, page rendering.

At 408, a value assigned to the portion of the intermediate representation is retrieved. In some implementations, the value assigned to the parameter may be retrieved by accessing the intermediate representation interface at operation 214 as shown in FIG. 2. The value retrieved at 408 may be the result of the invocation of the page at 406 when the data model is updated at 404. That is, the value assigned to the portion of the intermediate representation may depend at least in part on the update to the data model performed at operation 404.

At 410, a determination is made as to whether analyzing the portion of the intermediate representation requires interacting with a UI component object. In some implementations, UI component objects may not necessarily be created when compiling a page test procedure. Instead, such objects may be dynamically created at run time.

In some implementations, the determination made at 410 may be made at least in part based on whether the portion of the intermediate representation for which a value is retrieved at 408 includes or references any UI components. If so, then information regarding these components may be necessary in order to compare the retrieved value assigned to the portion of the intermediate representation with an expected value for the portion of the intermediate representation. For example, a data field associated with a UI component in the intermediate representation may be compared with an expected value for that data field.

At 412, an instance of the UI component object is simulated. In some implementations, simulating an instance of the UI component object may include retrieving a component definition for the UI component, determining data fields associated with the UI component, and any other necessary operations.

At 414, an expected value for a portion of the intermediate representation is identified. In some implementations, the expected value may be the value that the corresponding portion of the intermediate representation is expected to possess if the page markup, the UI components referenced within the page markup, and computer programming language instructions used to generate the page are functioning properly.

If an instance of a UI component object was simulated at 412, then the expected value for the portion of the intermediate representation may include or reflect the simulated UI component object instance. For example, the expected value for the portion of the intermediate representation may include any necessary data fields and identifiers for the UI component included or referenced in the portion of the intermediate representation.

In some implementations, the expected value may correspond to any portion of the page represented by the intermediate representation. The expected value may be defined within the test procedure. Alternately, the expected value may be stored on a storage medium and retrieved via the test procedure.

At 416, a determination is made as to whether the retrieved value matches the expected value for the portion of the intermediate representation. In some implementations, the determination may be made by comparing data values in memory. For example, a data field in a simulated UI component instance in the expected value of the portion of the intermediate representation may be compared with an actual value for the data field in the UI component instance contained within the intermediate representation.

In some implementations, testing a value of a portion of the intermediate representation allows the page markup code and computer programming language instructions used to generate the page to be tested prior to rendering the page. In this way, the page markup code and computer programming language instructions may be tested more directly than would be the case if the page were tested after rendering the page or displaying the page on a display screen.

At 418, an indication that the test is passed is transmitted. Because the retrieved data value matches the expected value, the test may be considered a success. The indication of the test results may be used in various ways. In some implementations, the indication that the test is passed may be stored in a storage location such as a database. Alternately, or additionally, the indication that the test is passed may be transmitted to a user such as an administrator or developer responsible who created or initiated the test procedure.

At 420, an indication that the test is not passed is transmitted. Because the retrieved data value does not match the expected value, the test may be considered a failure. As discussed with respect to operation 418, the indication of the test result may be stored in a storage location, transmitted to user, or used in any other way.

The method 400 is a simple example of the testing procedures that may be performed, and other testing procedures may be substantially more complex than the method shown in FIG. 4. For example, more than one change may be made to the data model at 404, more than one UI component object may be simulated at operation 412, and more than one portion of the intermediate representation may be checked at operations 408-412. As another example, a testing procedure may invoke the page more than one time, successively testing the effects of various changes to the page data model on the resulting intermediate representation. As yet another example, a testing procedure may combine operations shown in FIG. 4 with operations shown in FIG. 5, which may allow bi-directional testing of the page invocation.

FIG. 5 shows a flow diagram of a method 500 for a test procedure B. The method 500 is an example of the type of testing procedure that can be used in conjunction with the techniques described herein in some implementations.

In some implementations, the method 500 is an example of a test procedure that may be executed at operation 208 shown in FIG. 2. The test procedure may be compiled prior to execution. For example, the test procedure shown in FIG. 5 may be received at 202, compiled at 206, and executed at 208.

In many respects, the method 500 shown in FIG. 5 is substantially similar to the method 400 shown in FIG. 4. For instance, operations 502, 504, 506, 510, 518, 520, and 522 shown in FIG. 5 may be substantially similar to operations 402, 404, 406, 410, 416, 418, and 420 shown in FIG. 4. Thus, operations in FIG. 5 are described herein primarily with respect to the actions or features that may be different than those shown in FIG. 4.

The method 500 is an example of a test procedure in which a page is tested by initiating an action in the intermediate representation of an invoked page and checking a result of the change in the data model. In some implementations, one or more of the operations shown in FIG. 5 may be performed at operation 208 shown in FIG. 2. For example, an action in the intermediate representation may be initiate via the intermediate representation interface at operation 214. Then the page may be invoked via the invoke page interface at operation 212. In some instances, the initiated action may affect a parameter value in the data model. Finally, a value may be checked in the affected data model via the page data model interface at operation 210.

In some implementations, the initiated action may be a standard action associated with a standard page controller. For example, the initiated action may be a save action saving a data value modified in the intermediate representation. In some implementations the initiated action may be a custom action associated with a custom page controller. For example, the initiated action may be a translate action that translates a data value in the intermediate value to a different format or language. In some implementations, a hybrid controller may extend a standard controller with customized data fields or methods.

One example of a test method conceptually similar to the method shown in FIG. 5 is as follows. An account component representing an account object may be generated within a page. Then, a value within the intermediate representation of the account object may be modified by the test method. The test method may initiate an action in the intermediate representation to save the modified value. After initiating the save action, the test method may check the corresponding value of the account object as stored in the database to determine whether the value stored in the database matches the value as modified in the page.

As discussed with respect to operation 512, the action initiated in the test procedure method 500 shown in FIG. 5 may include triggering a method or procedure call that would normally be triggered via the execution of a script in a rendered page.

At 508, a determination is made as to initiating the test action requires interacting with a UI component object. In some implementations, UI component objects may not necessarily be created when compiling a page test procedure. Instead, such objects may be dynamically created at run time.

In some implementations, the determination made at 508 may be made at least in part based on whether the action initiated at 512 is associated with or references any UI components. If so, then information regarding these components may be necessary in order to initiate the action. For example, a method call to a method associated with a UI component in the intermediate representation may be performed. However, the definition of this method call and any associated parameters or return values may be defined within the UI component definition. If an instance of a UI component object is needed, then an instance of the UI component object is simulated at 510 in a manner similar to that discussed with respect to operation 412 in FIG. 4.

At 512, an action is initiated in the intermediate representation. In some implementations, the action may be initiated via the intermediate representation interface 214 shown in FIG. 2. Initiating the action may include performing an operation for directly triggering a method or procedure call that would normally be triggered via the execution of a script in a rendered page. For example, the action may be initiated by triggering computer programming instructions in the simulated UI component object with reference to the intermediate representation. As another example, the action may be initiated by triggering computer programming instructions in a page controller corresponding to the page being tested.

In some implementations, the test procedure may change the structure of the intermediate representation. For example, the test procedure may substitute one component included within the intermediate representation with another component. Then, the test procedure may initiate an action with respect to the substituted component.

At 514, an expected value for the parameter is identified. In some implementations, the expected value may be the value that the corresponding portion of the data model is expected to be assigned if the markup and computer programming language instructions used to generate the action initiated at 512 are functioning properly. That is, the action initiated at 512 should cause the portion of the data model to assume the expected value if the page is functioning properly.

In some implementations, the expected value may correspond to any parameter within the data model associated with the page. The expected value may be defined within the test procedure. Alternately, the expected value may be stored on a storage medium and retrieved via the test procedure.

At 516, a value assigned to the parameter in the data model is retrieved. In some implementations, the data value assigned to the parameter may be retrieved by accessing the data model interface at operation 210 as shown in FIG. 2. The data value retrieved at 516 may be the result of the action initiated in the intermediate representation at 512.

At 518, the retrieved value is compared with the expected value. As discussed herein, the operations 518, 520, and 522 may be substantially similar to the operations 416, 418, and 420 shown in FIG. 4.

The method 500 is a simple example of the testing procedures that may be performed, and other testing procedures may be substantially more complex than the method shown in FIG. 5. As a first example, more than one action may be initiated in the intermediate representation at 512, and/or more than one data model portion value may be checked at operations 514-522. As second example, a testing procedure may invoke the page more than one time, successively testing the effects of actions in the intermediate representation on the resulting data model. As a third example, a testing procedure may combine operations shown in FIG. 5 with operations shown in FIG. 4, which may allow bi-directional testing of the page invocation. As a fourth example, changes may be made to the data model before invoking the page at 506, for instance to determine whether a page action initiated in the intermediate representation may have different effects on a data model parameter value based on the original content of the data model.

The following computer programming instructions provide an example of a test process. In the class mypagetests, the data model is provided in part 1, and the page is invoked in part 2. Part 3 retrieves a portion of the intermediate representation, and part 4 performs various tests of the retrieved portion of the intermediate representation.

```
public class mypagetests {
    public static testmethod void basicTest( ) {
        PageReference p = Page.mypage;
            /* Part 1: Need to setup the data so the code will be exercised
            appropriately */
        List<Contact> contacts =
        TestUtils.setupTestContactsOtherAccountOwner( );
            /* Part 2: Invoke page generator to execute the page */
        Component.Apex.Page thePage = Test.invokePage(p);
            /* Part 3: Post-execution test code: */
        Component.Apex.Datatable dt = (Component.Apex.Datatable)
            thePage.getComponentById('theTable');
            /* Part 4: Assert the value attribute has a size of 2. */
        List<Contact> compContacts = (List<Contact>) dt.value;
        System.assertEquals(2, compContacts.size( ));
        // Get the instances
        ApexPages.ComponentIteration[ ] rows = dt.componentIterations;
        // Assert there are two instances
        System.assertEquals(2, rows.size( ));
        for(ApexPages.ComponentIteration row : rows) {
            Component.Apex.Column name = (Component.Apex.Column)
            row.getComponentById('nameColumn');
            Component.Photo photo =
            (Component.Photo)row.getComponentById('photo');
            Contact contact = row.iterationValue;
            /* Assert the contacts are not owned by the running user. */
            System.assert(contact.account.ownerId != UserInfo.getUserId( ));
            /* Assert the custom component has the expected value. */
            System.assert(photo.showAltPhoto);
        }
    }
}
```

Figure 7A:
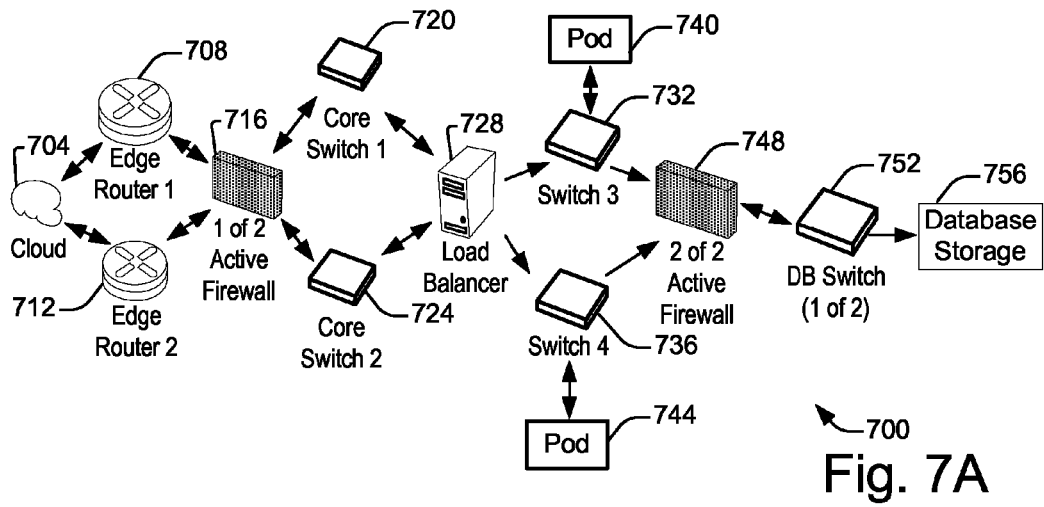
FIG. 7A shows a system diagram 700 illustrating architectural components of an on-demand service environment, in accordance with one embodiment.

FIG. 7A shows a system diagram 700 illustrating architectural components of an on-demand service environment, in accordance with one embodiment.

A client machine located in the cloud 704 (or Internet) may communicate with the on-demand service environment via one or more edge routers 708 and 712. The edge routers may communicate with one or more core switches 720 and 724 via firewall 716. The core switches may communicate with a load balancer 728, which may distribute server load over different pods, such as the pods 740 and 744. The pods 740 and 744, which may each include one or more servers and/or other computing resources, may perform data processing and other operations used to provide on-demand services. Communication with the pods may be conducted via pod switches 732 and 736. Components of the on-demand service environment may communicate with a database storage system 756 via a database firewall 748 and a database switch 752.

Figure 7B:
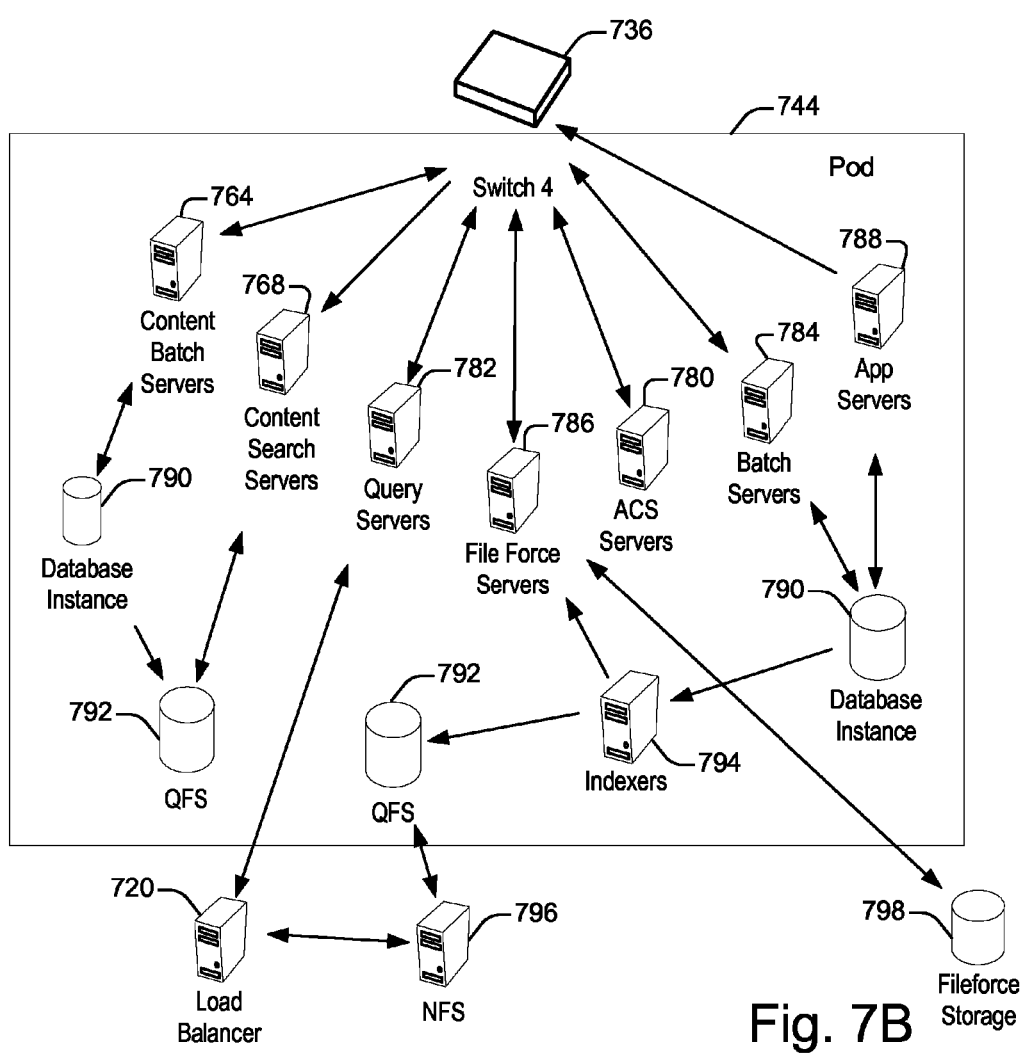
FIG. 7B shows a system diagram further illustrating architectural components of an on-demand service environment, in accordance with one embodiment.

As shown in FIGS. 7A and 7B, accessing an on-demand service environment may involve communications transmitted among a variety of different hardware and/or software components. Further, the on-demand service environment 700 is a simplified representation of an actual on-demand service environment. For example, while only one or two devices of each type are shown in FIGS. 7A and 7B, some implementations of an on-demand service environment may include anywhere from one to many devices of each type. Also, the on-demand service environment need not include each device shown in FIGS. 7A and 7B, or may include additional devices not shown in FIGS. 7A and 7B.

Moreover, one or more of the devices in the on-demand service environment 700 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 704 is intended to refer to a data network or plurality of data networks, often including the Internet. Client machines located in the cloud 704 may communicate with the on-demand service environment to access services provided by the on-demand service environment. For example, client machines may access the on-demand service environment to retrieve, store, edit, and/or process information.

In some implementations, the edge routers 708 and 712 route packets between the cloud 704 and other components of the on-demand service environment 700. The edge routers 708 and 712 may employ the Border Gateway Protocol (BGP). The BGP is the core routing protocol of the Internet. The edge routers 708 and 712 may maintain a table of IP networks or 'prefixes' which designate network reachability among autonomous systems on the Internet.

In one or more implementations, the firewall 716 may protect the inner components of the on-demand service environment 700 from Internet traffic. The firewall 716 may block, permit, or deny access to the inner components of the on-demand service environment 700 based upon a set of rules and other criteria. The firewall 716 may act as one or more of a packet filter, an application gateway, a stateful filter, a proxy server, or any other type of firewall.

In some implementations, the core switches 720 and 724 are high-capacity switches that transfer packets within the on-demand service environment 700. The core switches 720 and 724 may be configured as network bridges that quickly route data between different components within the on-demand service environment. In some implementations, the use of two or more core switches 720 and 724 may provide redundancy and/or reduced latency.

In some implementations, the pods 740 and 744 may perform the core data processing and service functions provided by the on-demand service environment. Each pod may include various types of hardware and/or software computing resources. An example of the pod architecture is discussed in greater detail with reference to FIG. 7B.

In some implementations, communication between the pods 740 and 744 may be conducted via the pod switches 732 and 736. The pod switches 732 and 736 may facilitate communication between the pods 740 and 744 and client machines located in the cloud 704, for example via core switches 720 and 724. Also, the pod switches 732 and 736 may facilitate communication between the pods 740 and 744 and the database storage 756.

In some implementations, the load balancer 728 may distribute workload between the pods 740 and 744. Balancing the on-demand service requests between the pods may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748. The database firewall 748 may act as a computer application firewall operating at the database application layer of a protocol stack. The database firewall 748 may protect the database storage 756 from application attacks such as structure query language (SQL) injection, database rootkits, and unauthorized information disclosure.

In some implementations, the database firewall 748 may include a host using one or more forms of reverse proxy services to proxy traffic before passing it to a gateway router.

The database firewall 748 may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, communication with the database storage system 756 may be conducted via the database switch 752. The multi-tenant database system 756 may include more than one hardware and/or software components for handling database queries. Accordingly, the database switch 752 may direct database queries transmitted by other components of the on-demand service environment (e.g., the pods 740 and 744) to the correct components within the database storage system 756.

In some implementations, the database storage system 756 is an on-demand database system shared by many different organizations. The on-demand database system may employ a multi-tenant approach, a virtualized approach, or any other type of database approach. An on-demand database system is discussed in greater detail with reference to FIGS. 8 and 9.

FIG. 7B shows a system diagram illustrating the architecture of the pod 744, in accordance with one embodiment. The pod 744 may be used to render services to a user of the on-demand service environment 700.

In some implementations, each pod may include a variety of servers and/or other systems. The pod 744 includes one or more content batch servers 764, content search servers 768, query servers 772, file force servers 776, access control system (ACS) servers 780, batch servers 784, and app servers 788. Also, the pod 744 includes database instances 790, quick file systems (QFS) 792, and indexers 794. In one or more implementations, some or all communication between the servers in the pod 744 may be transmitted via the switch 736.

In some implementations, the application servers 788 may include a hardware and/or software framework dedicated to the execution of procedures (e.g., programs, routines, scripts) for supporting the construction of applications provided by the on-demand service environment 700 via the pod 744. Some such procedures may include operations for providing the services described herein.

The content batch servers 764 may requests internal to the pod. These requests may be long-running and/or not tied to a particular customer. For example, the content batch servers 764 may handle requests related to log mining, cleanup work, and maintenance tasks.

The content search servers 768 may provide query and indexer functions. For example, the functions provided by the content search servers 768 may allow users to search through content stored in the on-demand service environment.

The Fileforce servers 776 may manage requests information stored in the Fileforce storage 778. The Fileforce storage 778 may store information such as documents, images, and basic large objects (BLOBs). By managing requests for information using the Fileforce servers 776, the image footprint on the database may be reduced.

The query servers 772 may be used to retrieve information from one or more file systems. For example, the query system 772 may receive requests for information from the app servers 788 and then transmit information queries to the NFS 796 located outside the pod.

The pod 744 may share a database instance 790 configured as a multi-tenant environment in which different organizations share access to the same database. Additionally, services rendered by the pod 744 may require various hardware and/or software resources. In some implementations, the ACS servers 780 may control access to data, hardware resources, or software resources.

In some implementations, the batch servers 784 may process batch jobs, which are used to run tasks at specified times. Thus, the batch servers 784 may transmit instructions to other servers, such as the app servers 788, to trigger the batch jobs.

In some implementations, the QFS 792 may be an open source file system available from Sun Microsystems® of Santa Clara, Calif. The QFS may serve as a rapid-access file system for storing and accessing information available within the pod 744. The QFS 792 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 768 and/or indexers 794 to identify, retrieve, move, and/or update data stored in the network file systems 796 and/or other storage systems.

In some implementations, one or more query servers 772 may communicate with the NFS 796 to retrieve and/or update information stored outside of the pod 744. The NFS 796 may allow servers located in the pod 744 to access information to access files over a network in a manner similar to how local storage is accessed.

In some implementations, queries from the query servers 722 may be transmitted to the NFS 796 via the load balancer 720, which may distribute resource requests over various resources available in the on-demand service environment. The NFS 796 may also communicate with the QFS 792 to update the information stored on the NFS 796 and/or to provide information to the QFS 792 for use by servers located within the pod 744.

In some implementations, the pod may include one or more database instances 790. The database instance 790 may transmit information to the QFS 792. When information is transmitted to the QFS 792, it may be available for use by servers within the pod 744 without requiring an additional database call.

In some implementations, database information may be transmitted to the indexer 794. Indexer 794 may provide an index of information available in the database 790 and/or QFS 792. The index information may be provided to file force servers 776 and/or the QFS 792.

Figure 8:
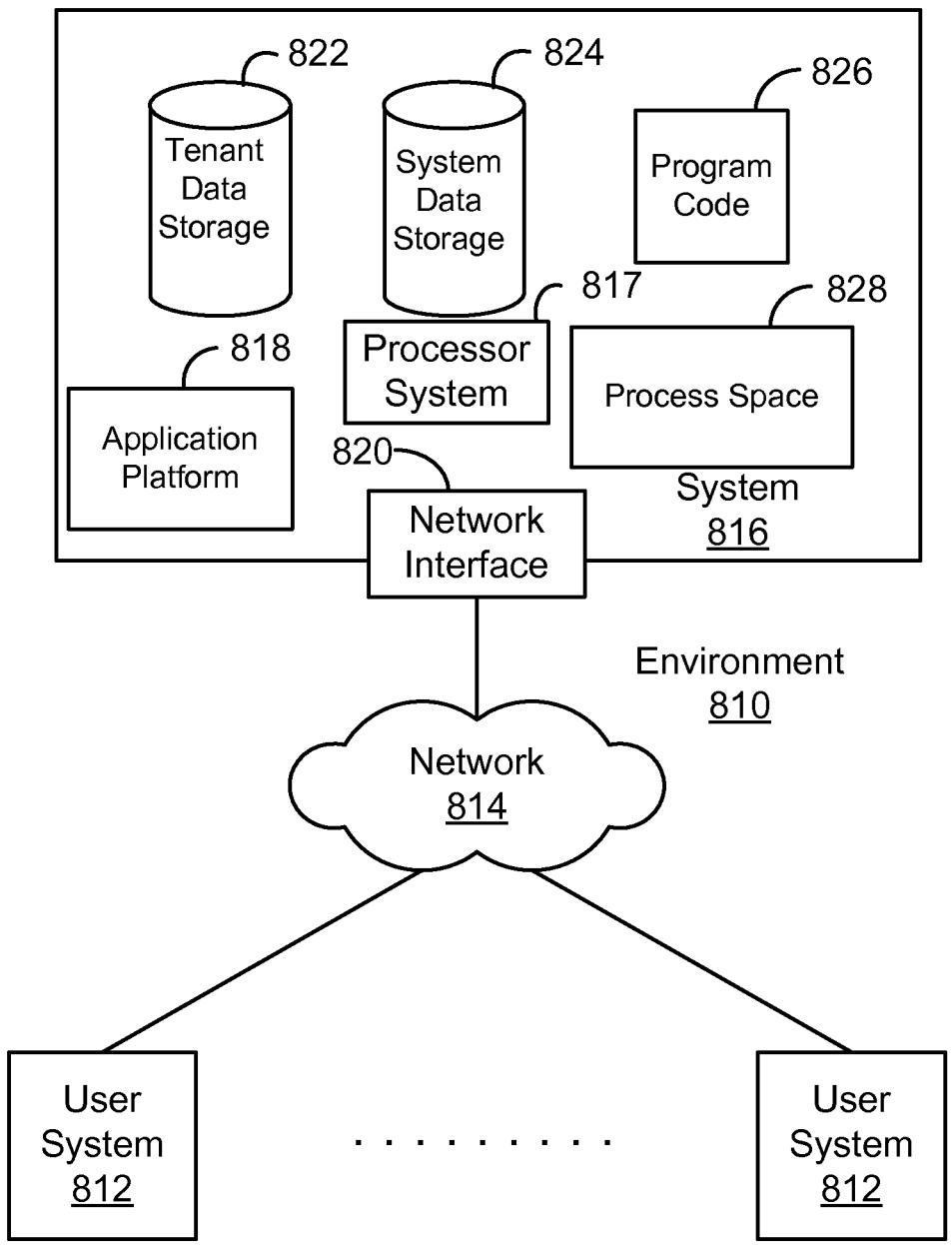
FIG. 8 shows a system diagram 810 illustrating the architecture of a multitenant database environment, in accordance with one embodiment.

FIG. 8 shows a block diagram of an environment 810 wherein an on-demand database service might be used, in accordance with one embodiment.

Figure 9:
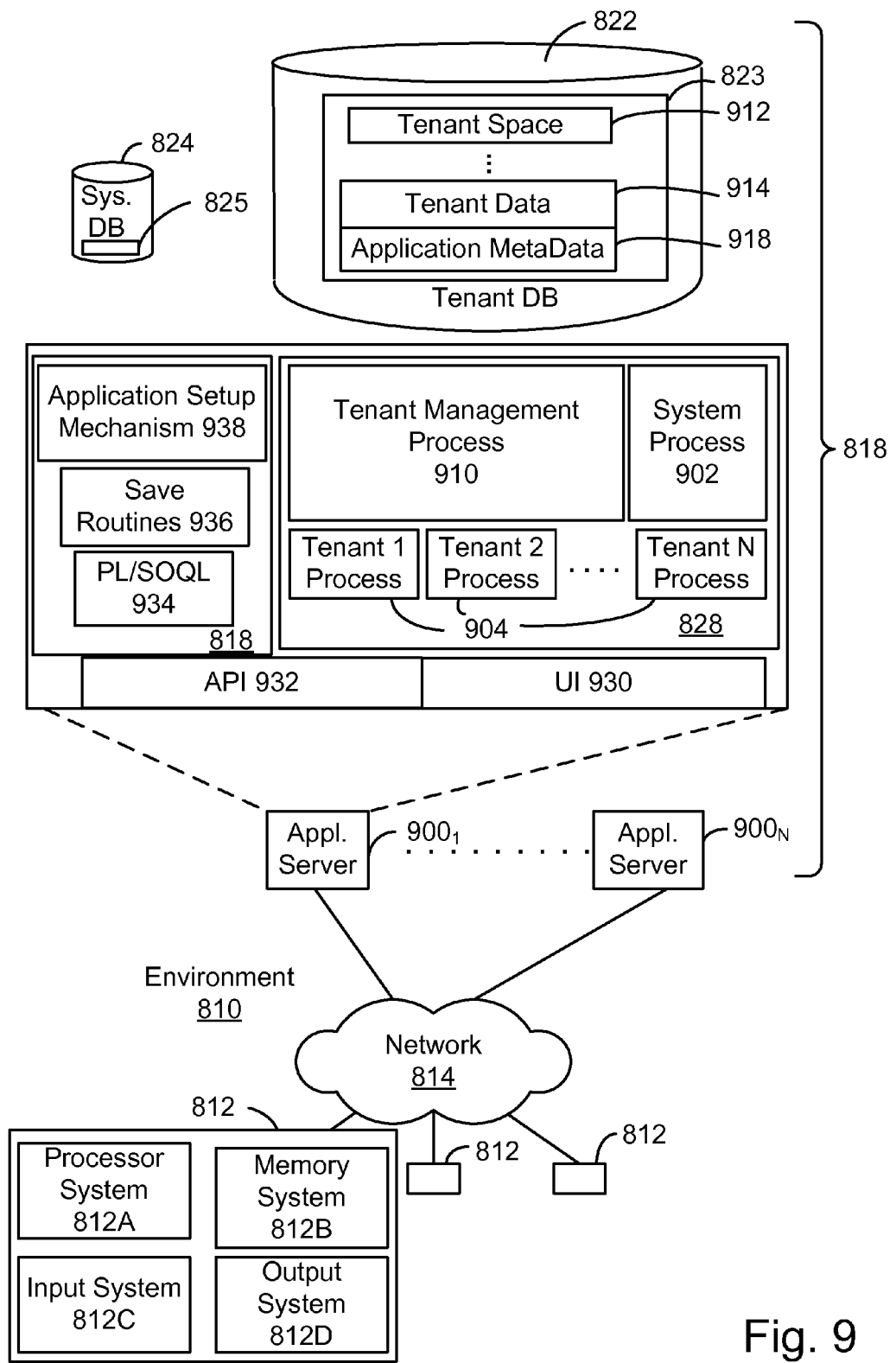
FIG. 9 shows a system diagram 810 further illustrating the architecture of a multitenant database environment, in accordance with one embodiment.

Environment 810 includes an on-demand database service 816. User system 812 may be any machine or system that is used by a user to access a database user system. For example, any of user systems 812 can be a handheld computing device, a mobile phone, a laptop computer, a work station, and/or a network of computing devices. As illustrated in FIGS. 8 and 9, user systems 812 might interact via a network 814 with the on-demand database service 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 816" and "system 816" will be used interchangeably herein. A database image may include one or more database objects. A relational database management system (RDBMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

The users of user systems 812 may differ in their respective capacities, and the capacity of a particular user system 812 might be entirely determined by permissions (permission levels) for the current user. For example, where a call center agent is using a particular user system 812 to interact with system 816, the user system 812 has the capacities allotted to that call center agent. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, web pages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 816 implements applications other than, or in addition to, a CRM application. For example, system 816 may provide tenant access to multiple hosted (standard and custom) applications. User (or third party developer) applications, which may or may not include CRM, may be supported by the application platform 818, which manages creation, storage of the applications into one or more database objects and executing of the applications in a virtual machine in the process space of the system 816.

Each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814.

Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

A computer program product embodiment includes a machine-readable storage medium (media) having instructions stored thereon/in which can be used to program a computer to perform any of the processes of the implementations described herein. Computer code for operating and configuring system 816 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also shows a block diagram of environment 810 further illustrating system 816 and various interconnections, in accordance with one embodiment. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 9001-900N, system process space 902, tenant process spaces 904, tenant management process space 910, tenant storage area 912, user storage 914, and application metadata 916. In other implementations, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of processors. Memory system 812B may be any combination of one or more memory devices, short term, and/or long term memory. Input system 812C may be any combination of input devices, such as keyboards, mice, trackballs, scanners, cameras, and/or interfaces to networks. Output system 812D may be any combination of output devices, such as monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as Oracle™ databases.

Application platform 818 includes an application setup mechanism 938 that supports application developers' creation and management of applications, which may be saved as metadata into tenant data storage 822 by save routines 936 for execution by subscribers as tenant process spaces 904 managed by tenant management process 910 for example. Invocations to such applications may be coded using PL/SOQL 34 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 9001 might be coupled via the network 814 (e.g., the Internet), another application server 900N−1 might be coupled via a direct network link, and another application server 900N might be coupled by yet a different network connection. Transfer Control Protocol and Internet Protocol (TCP/IP) are typical protocols for communicating between application servers 900 and the database system. However, other transport protocols may be used to optimize the system depending on the network interconnect used.

In certain implementations, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain implementations, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each call center agent uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain implementations, user systems 812 (which may be client machines/systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of compiling a procedure for testing an electronic document page, the method comprising:
    processing computer programming instructions defining a test procedure for testing an electronic document page, the page being defined by a page description implemented in a markup language, the page description including a reference to a first portion of a component object;
    receiving a component definition for the component object without receiving an entire class definition for the component object, the component definition including one or more attributes of the component object without including all of the code required to instantiate the entire component object;
    generating compiled wrapper code operable to simulate the presence of an instance of the first portion of the component object referenced in the page description; and
    generating a compiled test procedure based on the computer programming language instructions, the compiled test procedure including the compiled wrapper code, the compiled test procedure capable of being executed to perform the test procedure, the compiled wrapper code enabling interaction of the compiled test procedure with data associated with the instance of the component object when the compiled test procedure is executed to perform the test procedure on the page.

2. The method recited in claim 1, wherein the page description does not include a reference to a second portion of the component object, and wherein the compiled wrapper code does not simulate the presence of the second portion of the component object.

3. The method recited in claim 1, wherein the compiled wrapper code comprises a data field associated with the first portion of the component object, the data field being defined by a data field definition within the component definition, the data field definition specifying a data field identifier and a data field type, the data field identifier and the data field type being included in the compiled wrapper code.

4. The method recited in claim 1, wherein the compiled wrapper code comprises a function associated with the first portion of the component object, the function being defined in accordance with a function definition included in the component definition, the function definition specifying a function identifier and one or more parameter values associated with the function, the function identifier and the one or more parameter values being included in the compiled wrapper code.

5. The method recited in claim 1, the method further comprising:
    compiling the page description to create an intermediate representation of the page, the intermediate representation including a representation of the first portion of the component object, the intermediate representation being renderable to create a rendered page, the rendered page being displayable on a display device.

6. The method recited in claim 5, wherein the compiled test procedure is configured to retrieve a portion of the intermediate representation for testing against an expected value, the retrieved portion of the intermediate representation including the representation of the first portion of the component object.

7. The method recited in claim 5, wherein the page description refers to data accessible via a data model, and wherein the intermediate representation includes at least a portion of the data accessible via the data model.

8. The method recited in claim 7, wherein the compiled test procedure is configured to retrieve a portion of the data model for testing against an expected value.

9. The method recited in claim 5, wherein the compiled test procedure is configured to simulate the initiation of an action, the action simulating user input that can be provided via a rendered representation of the page, the compiled test procedure being configured to simulate the initiation of the action by initiating a function associated with the first portion of the component object, the function being represented within the intermediate representation.

10. The method recited in claim 9, wherein the function is also represented within the compiled wrapper code included in the compiled test procedure.

11. The method recited in claim 1, wherein the compiled test procedure is made available for use via an on-demand service environment by two or more entities, and wherein data associated with the two or more of the entities is stored in a multitenant database accessible via a network.

12. A computing system comprising:
one or more computing devices configured to:
process computer programming instructions defining a test procedure for testing an electronic document page, the page being defined by a page description implemented in a markup language, the page description including a reference to a first portion of a component object;
receive a component definition for the component object without receiving an entire class definition for the component object, the component definition including one or more attributes of the component object without including all of the code required to instantiate the entire component object;
generate compiled wrapper code operable to simulate the presence of an instance of the first portion of the component object referenced in the page description; and
generate a compiled test procedure based on the computer programming language instructions, the compiled test procedure including the compiled wrapper code, the compiled test procedure capable of being executed to perform the test procedure, the compiled wrapper code enabling interaction of the compiled test procedure with data associated with the instance of the component object when the compiled test procedure is executed to perform the test procedure on the page.

13. The computing system recited in claim 12, wherein the page description does not include a reference to a second portion of the component object, and wherein the compiled wrapper code does not simulate the presence of the second portion of the component object.

14. The computing system recited in claim 12, wherein the compiled wrapper code comprises a data field associated with the first portion of the component object, the data field being defined by a data field definition within the component definition, the data field definition specifying a data field identifier and a data field type, the data field identifier and the data field type being included in the compiled wrapper code.

15. The computing system recited in claim 12, wherein the compiled wrapper code comprises a function associated with the first portion of the component object, the function being defined in accordance with a function definition included in the component definition, the function definition specifying a function identifier and one or more parameter values associated with the function, the function identifier and the one or more parameter values being included in the compiled wrapper code.

16. The computing system recited in claim 12, wherein the one or more computing devices are configured to:
compile the page description to create an intermediate representation of the page, the intermediate representation including a representation of the first portion of the component object, the intermediate representation being renderable to create a rendered page, the rendered page being displayable on a display device.

17. The computing system recited in claim 16, wherein the compiled test procedure is configured to retrieve a portion of the intermediate representation for testing against an expected value, the retrieved portion of the intermediate representation including the representation of the first portion of the component object.

18. The computing system recited in claim 16, wherein the page description refers to data accessible via a data model, and wherein the intermediate representation includes at least a portion of the data accessible via the data model.

19. One or more computer readable media having instructions stored thereon for performing a method of compiling a procedure for testing a page, the method comprising:
receiving computer programming instructions defining a test procedure for testing an electronic document page, the page being defined by a page description implemented in a markup language, the page description including a reference to a first portion of a component object;
receiving a component definition for the component object without receiving an entire class definition for the component object, the component definition including one or more attributes of the component object without including all of the code required to instantiate the entire component object;
generating compiled wrapper code operable to simulate the presence of an instance of the first portion of the component object referenced in the page description; and
generating a compiled test procedure based on the computer programming language instructions, the compiled test procedure including the compiled wrapper code, the compiled test procedure capable of being executed to perform the test procedure, the compiled wrapper code enabling interaction of the compiled test procedure with data associated with the instance of the component object when the compiled test procedure is executed to perform the test procedure on the page.

20. The one or more computer readable media recited in claim 19, wherein the page description does not include a reference to a second portion of the component object, and wherein the compiled wrapper code does not simulate the presence of the second portion of the component object.

21. The one or more computer readable media recited in claim 19, wherein the compiled wrapper code comprises a data field associated with the first portion of the component object, the data field being defined by a data field definition within the component definition, the data field definition specifying a data field identifier and a data field type, the data field identifier and the data field type being included in the compiled wrapper code.

22. The one or more computer readable media recited in claim 19, wherein the compiled wrapper code comprises a function associated with the first portion of the component object, the function being defined in accordance with a function definition included in the component definition, the function definition specifying a function identifier and one or more parameter values associated with the function, the function identifier and the one or more parameter values being included in the compiled wrapper code.

23. The one or more computer readable media recited in claim 19, the method further comprising:
compiling the page description to create an intermediate representation of the page, the intermediate representation including a representation of the first portion of the component object, the intermediate representation being renderable to create a rendered page, the rendered page being displayable on a display device.

24. The one or more computer readable media recited in claim 23, wherein the compiled test procedure is configured to retrieve a portion of the intermediate representation for testing against an expected value, the retrieved portion of the intermediate representation including the representation of the first portion of the component object.

25. The one or more computer readable media recited in claim 23, wherein the page description refers to data accessible via a data model, and wherein the intermediate representation includes at least a portion of the data accessible via the data model.

\* \* \* \* \*